(12) United States Patent
Wu et al.

(10) Patent No.: US 12,737,860 B2
(45) Date of Patent: Sep. 15, 2026

(54) IMAGE PROCESSING FOR EXPOSURE BRACKETING

(71) Applicant: QUALCOMM Incorporated, San Diego, CA (US)

(72) Inventors: Meng-Lin Wu, San Diego, CA (US); Venkata Ravi Kiran Dayana, San Diego, CA (US); Sandesh Ghimire, San Diego, CA (US); Kai Liu, Taipei (TW); Ching-Fu Chen, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 18/462,218

(22) Filed: Sep. 6, 2023

(65) Prior Publication Data

US 2025/0078227 A1 Mar. 6, 2025

(51) Int. Cl.
*G06T 5/92* (2024.01)
*G06T 5/50* (2006.01)
*H04N 23/743* (2023.01)

(52) U.S. Cl.
CPC ................. *G06T 5/92* (2024.01); *G06T 5/50* (2013.01); *G06T 2207/20208* (2013.01); *G06T 2207/20221* (2013.01); *G06T 2207/20224* (2013.01)

(58) Field of Classification Search
CPC ... G06T 5/92; G06T 5/50; G06T 2207/20208; G06T 2207/20221; G06T 2207/20224; G06T 2200/21; G06T 2207/10016; G06T 2207/10144; H04N 23/741; H04N 23/80; H04N 23/951; H04N 25/583; H04N 25/589; H04N 23/743
See application file for complete search history.

(56) References Cited

U.S. PATENT DOCUMENTS 11,055,827 B2 7/2021 Bouzaraa et al.
11,113,802 B1 9/2021 Sun et al.
(Continued)

FOREIGN PATENT DOCUMENTS

JP 6688165 B2 4/2020
WO WO-2023070660 A1 5/2023

OTHER PUBLICATIONS

International Search Report and Written Opinion—PCT/US2024/045008—ISA/EPO—Nov. 19, 2024 (2305119U2WO).

*Primary Examiner* — Amandeep Saini
*Assistant Examiner* — Emma Rose Goebel
(74) *Attorney, Agent, or Firm* — QUALCOMM Incorporated

(57) ABSTRACT

This disclosure provides systems, methods, and devices for image signal processing that support image signal processing of exposure bracketed image frames. In a first aspect, a method of image processing includes receiving, by at least one processor, image data comprising first image data of a first exposure duration, second image data of a second exposure duration, and third image data of a third exposure duration, wherein the first exposure duration is equal to the third exposure duration; determining, by the at least one processor, fourth image data by subtracting corresponding pixel intensity values of the third image data from the second image data; and determining, by the at least one processor, a first output image frame by combining the fourth image data with the first image data. Other aspects and features are also claimed and described.

23 Claims, 9 Drawing Sheets

(56) References Cited

U.S. PATENT DOCUMENTS 11,373,281 B1 6/2022 Ravirala
2009/0040364 A1 2/2009 Rubner
2010/0201862 A1* 8/2010 Hatabu .................. H04N 25/73
348/E5.037
2011/0147588 A1 6/2011 Chaudhuri et al.
2014/0168468 A1 6/2014 Levoy et al.
2014/0347521 A1 11/2014 Hasinoff et al.
2015/0350515 A1 12/2015 Demandolx et al.
2016/0037043 A1 2/2016 Wang et al.
2016/0037060 A1* 2/2016 Lim ....................... H04N 23/80
348/241
2016/0255262 A1 9/2016 Lee et al.
2017/0187970 A1 6/2017 Zhou et al.
2017/0231711 A1 8/2017 Abt
2017/0374293 A1* 12/2017 Sekine ................. H04N 23/743
2019/0306399 A1* 10/2019 Fujinami .............. H04N 25/589
2020/0045220 A1* 2/2020 Kobayashi ........... H04N 25/583
2020/0280704 A1* 9/2020 Galor Gluskin .......... G06T 7/50
2021/0158496 A1 5/2021 Bouchard et al.
2022/0377265 A1* 11/2022 Zhu ........................... G06T 7/00
2023/0038844 A1* 2/2023 Li ........................ H04N 23/741
2023/0134194 A1 5/2023 McCarten et al.
2025/0080858 A1 3/2025 Wu et al.

* cited by examiner

IMAGE PROCESSING FOR EXPOSURE BRACKETING

TECHNICAL FIELD

Aspects of the present disclosure relate generally to image processing, and more particularly, to image processing of exposure-bracketed image frames. Some features may enable and provide improved image processing in low-light multi-frame imaging, high-motion photography, or other applications of exposure bracketing, including improved dynamic range in images while reducing motion blur occurring from motion during image capture.

INTRODUCTION

Image capture devices are devices that can capture one or more digital images, whether still images for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

Dynamic range may be important to image quality when capturing a representation of a scene with a wide color gamut using an image capture device. Conventional image sensors have a limited dynamic range, which may be smaller than the dynamic range of human eyes. Dynamic range may refer to the light range between bright portions of an image and dark portions of an image. A conventional image sensor may increase an exposure time to improve detail in dark portions of an image at the expense of saturating bright portions of an image. Alternatively, a conventional image sensor may decrease an exposure time to improve detail in bright portions of an image at the expense of losing detail in dark portions of the image.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

High dynamic range (HDR) photography improves photography using these conventional image sensors by combining multiple recorded representations of a scene (e.g., image frames) from the image sensor. HDR photography may combine image frames of the same scene captured with different exposure lengths. The different exposure lengths capture different details of the scene. A long exposure image frame captures details in low-light portions of a scene. A short exposure image frame captures details in high-light portions of a scene.

Combining a long exposure image frame and a short exposure image frame conventionally involves aligning the image frames before fusing the image frames to obtain a single output image frame having higher dynamic range than either the long or short image frames individually. The alignment allows the fusion operation to fuse corresponding portions of the image frames. Alignment reduces artefacts resulting from the fact that the different image frames are captured at different times, during which the image capture device may have moved or an object in the scene may have moved. For example, global motion may cause motion blur in the long exposure frame, which reduces alignment accuracy. As another example, local motion may result in non-uniform image warping. The longer the duration of the long exposure frame capture the more difficult alignment becomes because the longer exposure results in a further temporal distance between the long image frame and the short image frame.

In some aspects of this disclosure, HDR image capture is performed by processing temporally-aligned image frames. Arranging the capture of image data to temporally align the image frames reduces or eliminates alignment performed on image frames when fusing the image frames to determine an output HDR image frame. The temporal alignment of image frames results in obtaining spatially aligned image frames. The temporally-aligned image frames may be obtained in a manner that assumes approximately linear motion within an exposure time, such that the temporal midpoint of exposure time coincides with the spatial midpoint of any scene motion. The temporally-aligned image frames may also be obtained in a manner that assumes exposure is a linear operation, such that all pixel values are assumed to be in a linear domain and pixel values are proportional to exposure time. Based on the assumptions, the capture of image frames using one of many different HDR techniques may be temporally arranged such that the resulting image frames are spatially aligned and may be processed without further alignment of the image frames for the purposes of fusing the image frames (although other alignment operations may be performed).

The use of temporally-aligned image frames in obtaining an output HDR image frame may include, for staggered HDR (sHDR) photography, setting up consecutive exposures with medium, short, and medium exposure times, and summing the three exposures to determine a long image frame. The image frames with short, medium, and long exposure times may combined to produce an HDR output image frame. The use of temporally-aligned image frames in obtaining an output HDR image frame may include, for quad HDR (qHDR) photography, setting up medium and short exposure frames and combining these images to produce an HDR output image frame. In other embodiments, techniques of this disclosure may be applied to other HDR capture techniques.

In one aspect of the disclosure, a method for image processing includes receiving, by at least one processor, image data comprising first image data of a first exposure duration, second image data of a second exposure duration, and third image data of a third exposure duration, wherein a second temporal center of the second image data is equally spaced, in time, between a first temporal center of the first image data and a third temporal center of the third image data; determining, by the at least one processor, first summed image data by summing corresponding pixel intensity values of the first image data, the second image data, and the third image data; and determining, by the at least one processor, a first output image frame by combining the first summed image data with the second image data.

In an additional aspect of the disclosure, an apparatus includes at least one processor and a memory coupled to the at least one processor. The at least one processor is configured to perform operations including receiving, by at least one processor, image data comprising first image data of a first exposure duration, second image data of a second exposure duration, and third image data of a third exposure duration, wherein a second temporal center of the second image data is equally spaced, in time, between a first temporal center of the first image data and a third temporal center of the third image data; determining, by the at least one processor, first summed image data by summing corresponding pixel intensity values of the first image data, the second image data, and the third image data; and determining, by the at least one processor, a first output image frame by combining the first summed image data with the second image data.

In an additional aspect of the disclosure, an apparatus includes means for receiving, by at least one processor, image data comprising first image data of a first exposure duration, second image data of a second exposure duration, and third image data of a third exposure duration, wherein a second temporal center of the second image data is equally spaced, in time, between a first temporal center of the first image data and a third temporal center of the third image data; means for determining, by the at least one processor, first summed image data by summing corresponding pixel intensity values of the first image data, the second image data, and the third image data; and means for determining, by the at least one processor, a first output image frame by combining the first summed image data with the second image data. The means for determining may include at least one processor, such as an image signal processor, a CPU, a GPU, a DSP, and/or a NSP. The means for receiving may include at least one processor, such as those described herein, and/or a network communication component.

In an additional aspect of the disclosure, a non-transitory computer-readable medium stores instructions that, when executed by a processor, cause the processor to perform operations. The operations include receiving, by at least one processor, image data comprising first image data of a first exposure duration, second image data of a second exposure duration, and third image data of a third exposure duration, wherein a second temporal center of the second image data is equally spaced, in time, between a first temporal center of the first image data and a third temporal center of the third image data; determining, by the at least one processor, first summed image data by summing corresponding pixel intensity values of the first image data, the second image data, and the third image data; and determining, by the at least one processor, a first output image frame by combining the first summed image data with the second image data.

In another aspect of the disclosure, a method for image processing includes receiving, by at least one processor, image data comprising first image data of a first exposure duration, second image data of a second exposure duration, and third image data of a third exposure duration; determining, by the at least one processor, fourth image data by subtracting corresponding pixel intensity values of the third image data from the second image data; and determining, by the at least one processor, a first output image frame by combining the fourth image data with the first image data.

In a further aspect of the disclosure, an apparatus includes at least one processor and a memory coupled to the at least one processor. The at least one processor is configured to perform operations including receiving, by at least one processor, image data comprising first image data of a first exposure duration, second image data of a second exposure duration, and third image data of a third exposure duration; determining, by the at least one processor, fourth image data by subtracting corresponding pixel intensity values of the third image data from the second image data; and determining, by the at least one processor, a first output image frame by combining the fourth image data with the first image data.

In yet another aspect of the disclosure, an apparatus includes means for receiving, by at least one processor, image data comprising first image data of a first exposure duration, second image data of a second exposure duration, and third image data of a third exposure duration; means for determining, by the at least one processor, fourth image data by subtracting corresponding pixel intensity values of the third image data from the second image data; and means for determining, by the at least one processor, a first output image frame by combining the fourth image data with the first image data.

In a further aspect of the disclosure, a non-transitory computer-readable medium stores instructions that, when executed by a processor, cause the processor to perform operations. The operations include receiving, by at least one processor, image data comprising first image data of a first exposure duration, second image data of a second exposure duration, and third image data of a third exposure duration; determining, by the at least one processor, fourth image data by subtracting corresponding pixel intensity values of the third image data from the second image data; and determining, by the at least one processor, a first output image frame by combining the fourth image data with the first image data.

Methods of image processing described herein may be performed by an image capture device and/or performed on image data captured by one or more image capture devices. Image capture devices, devices that can capture one or more digital images, whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

The image processing techniques described herein may involve digital cameras having image sensors and processing circuitry (e.g., application specific integrated circuits (ASICs), digital signal processors (DSP), graphics processing unit (GPU), or central processing units (CPU)). An image signal processor (ISP) may include one or more of these processing circuits and configured to perform operations to obtain the image data for processing according to the image processing techniques described herein and/or involved in the image processing techniques described herein. The ISP may be configured to control the capture of image frames from one or more image sensors and determine one or more image frames from the one or more image sensors to generate a view of a scene in an output image frame. The output image frame may be part of a sequence of image frames forming a video sequence. The video sequence may include other image frames received from the image sensor or other images sensors.

In an example application, the image signal processor (ISP) may receive an instruction to capture a sequence of image frames in response to the loading of software, such as a camera application, to produce a preview display from the image capture device. The image signal processor may be configured to produce a single flow of output image frames, based on images frames received from one or more image sensors. The single flow of output image frames may include raw image data from an image sensor, binned image data from an image sensor, or corrected image data processed by one or more algorithms within the image signal processor. For example, an image frame obtained from an image sensor, which may have performed some processing on the data before output to the image signal processor, may be processed in the image signal processor by processing the image frame through an image post-processing engine (IPE) and/or other image processing circuitry for performing one or more of tone mapping, portrait lighting, contrast enhancement, gamma correction, etc. The output image frame from the ISP may be stored in memory and retrieved by an application processor executing the camera application, which may perform further processing on the output image frame to adjust an appearance of the output image frame and reproduce the output image frame on a display for view by the user.

After an output image frame representing the scene is determined by the image signal processor and/or determined by the application processor, such as through image processing techniques described in various embodiments herein, the output image frame may be displayed on a device display as a single still image and/or as part of a video sequence, saved to a storage device as a picture or a video sequence, transmitted over a network, and/or printed to an output medium. For example, the image signal processor (ISP) may be configured to obtain input frames of image data (e.g., pixel values) from the one or more image sensors, and in turn, produce corresponding output image frames (e.g., preview display frames, still-image captures, frames for video, frames for object tracking, etc.). In other examples, the image signal processor may output image frames to various output devices and/or camera modules for further processing, such as for 3 A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. Generally, the image signal processor (ISP) may obtain incoming frames from one or more image sensors and produce and output a flow of output frames to various output destinations.

In some aspects, the output image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The device may include one, two, or more image sensors, such as a first image sensor. When multiple image sensors are present, the image sensors may be differently configured. For example, the first image sensor may have a larger field of view (FOV) than the second image sensor, or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. Any of these or other configurations may be part of a lens cluster on a mobile device, such as where multiple image sensors and associated lenses are located in offset locations on a frontside or a backside of the mobile device. Additional image sensors may be included with larger, smaller, or same field of views. The image processing techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors) and time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
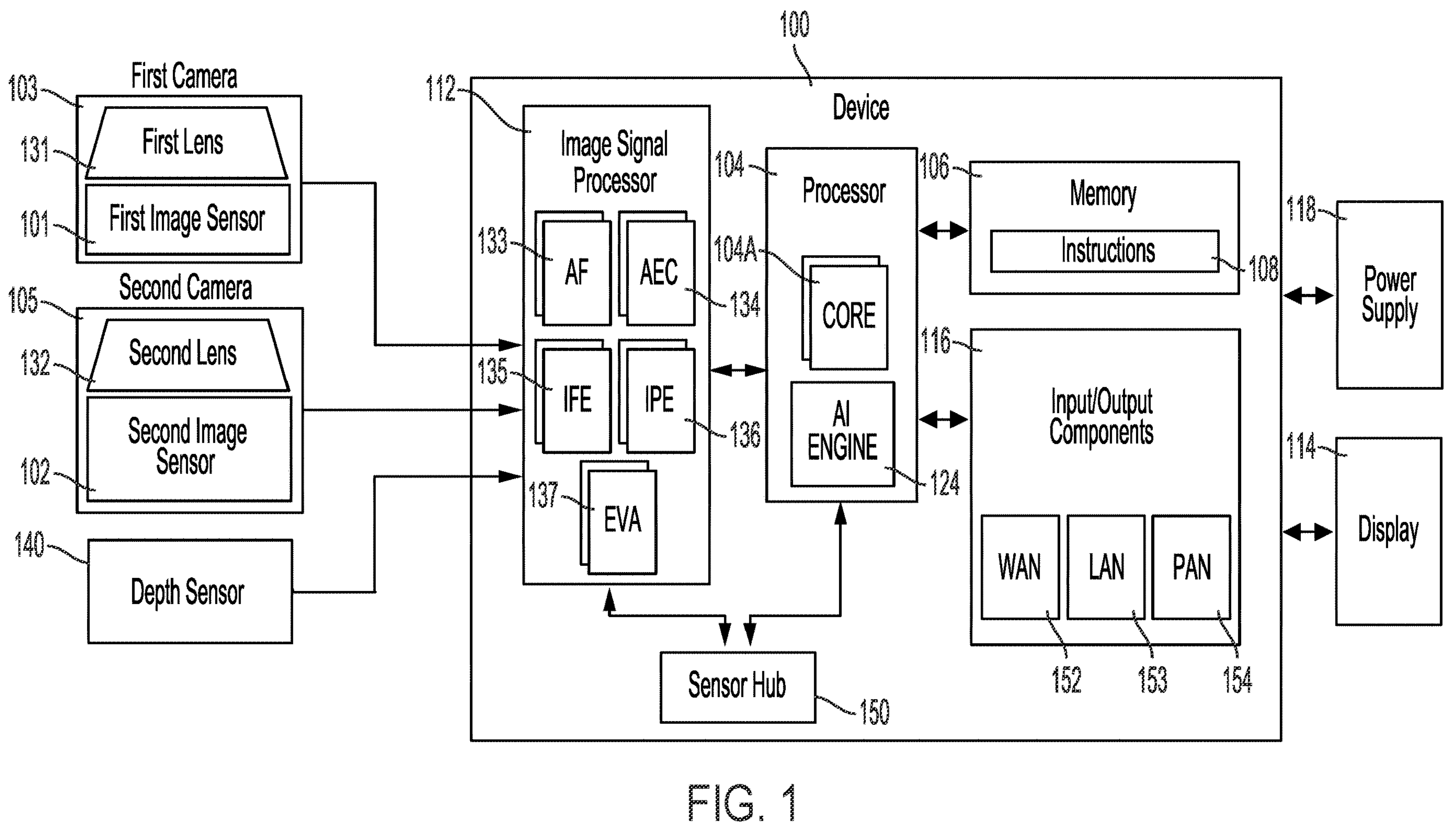
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support high dynamic range (HDR) image processing on image frames with temporally-aligned centers to reduce artifacts resulting from fusing image frames with different temporal centers. In some aspects, a method of image processing includes capturing three or more image frames having at least two different exposure lengths. The three or more image frames are processed to obtain two image frames with temporally-aligned centers, and those two image frames are processed in HDR fusion logic to obtain an output HDR image frame. Other aspects and features are also claimed and described. Image frames may be captured and/or processed in a manner that results in temporally-aligned image frames, such that the HDR fusion process that combines two image frames operates on image frames with corresponding pixel values.

No alignment processing may be performed when fusing these two image frames because the image frames have the same temporal center.

Particular implementations of the subject matter described in this disclosure may be implemented to realize one or more of the following potential advantages or benefits. In some aspects, the present disclosure provides techniques for improving the HDR image processing techniques. In particular, the capture of image data with temporally aligned images reduces the amount of processing during HDR image processing because certain operations, such as alignment operations including cropping and/or warping, may be omitted from the pipeline between the receiving of the image data and the fusion of two image frames of different exposure durations. The reduced computational requirement for processing HDR image frames may be particularly advantageous for high-framerate HDR-enabled video, in which the processor has significant processing demands to provide real-time processing. Further, the temporal alignment reduces artifacts in the image frame created by such alignment operations.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

An example device for capturing image frames using one or more image sensors, such as a smartphone, may include a configuration of one, two, three, four, or more camera modules on a backside (e.g., a side opposite a primary user display) and/or a front side (e.g., a same side as a primary user display) of the device. The devices may include one or more image signal processors (ISPs), Computer Vision Processors (CVPs) (e.g., AI engines), or other suitable circuitry for processing images captured by the image sensors. The one or more image signal processors (ISP) may store output image frames (such as through a bus) in a memory and/or provide the output image frames to processing circuitry (such as an applications processor). The processing circuitry may perform further processing, such as for encoding, storage, transmission, or other manipulation of the output image frames.

As used herein, a camera module may include the image sensor and certain other components coupled to the image sensor used to obtain a representation of a scene in image data comprising an image frame. For example, a camera module may include other components of a camera, including a shutter, buffer, or other readout circuitry for accessing individual pixels of an image sensor. In some embodiments, the camera module may include one or more components including the image sensor included in a single package with an interface configured to couple the camera module to an image signal processor or other processor through a bus.

FIG. 1 shows a block diagram of a device 100 for performing image capture from one or more image sensors. The device 100 may include, or otherwise be coupled to, an image signal processor (e.g., ISP 112) for processing image frames from one or more image sensors, such as a first image sensor 101, a second image sensor 102, and a depth sensor 140. In some implementations, the device 100 also includes or is coupled to a processor 104 and a memory 106 storing instructions 108 (e.g., a memory storing processor-readable code or a non-transitory computer-readable medium storing instructions). The device 100 may also include or be coupled to a display 114 and components 116. Components 116 may be used for interacting with a user, such as a touch screen interface and/or physical buttons.

Components 116 may also include network interfaces for communicating with other devices, including a wide area network (WAN) adaptor (e.g., WAN adaptor 152), a local area network (LAN) adaptor (e.g., LAN adaptor 153), and/or a personal area network (PAN) adaptor (e.g., PAN adaptor 154). A WAN adaptor 152 may be a 4G LTE or a 5G NR wireless network adaptor. A LAN adaptor 153 may be an IEEE 802.11 WiFi wireless network adapter. A PAN adaptor 154 may be a Bluetooth wireless network adaptor. Each of the WAN adaptor 152, LAN adaptor 153, and/or PAN adaptor 154 may be coupled to an antenna, including multiple antennas configured for primary and diversity reception and/or configured for receiving specific frequency bands. In some embodiments, antennas may be shared for communicating on different networks by the WAN adaptor 152, LAN adaptor 153, and/or PAN adaptor 154. In some embodiments, the WAN adaptor 152, LAN adaptor 153, and/or PAN adaptor 154 may share circuitry and/or be packaged together, such as when the LAN adaptor 153 and the PAN adaptor 154 are packaged as a single integrated circuit (IC).

The device 100 may further include or be coupled to a power supply 118 for the device 100, such as a battery or an adaptor to couple the device 100 to an energy source. The device 100 may also include or be coupled to additional features or components that are not shown in FIG. 1. In one example, a wireless interface, which may include a number of transceivers and a baseband processor in a radio frequency front end (RFFE), may be coupled to or included in WAN adaptor 152 for a wireless communication device. In a further example, an analog front end (AFE) to convert analog image data to digital image data may be coupled between the first image sensor 101 or second image sensor 102 and processing circuitry in the device 100. In some embodiments, AFEs may be embedded in the ISP 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, which is a device configured for measuring rotation, orientation, and/or angular velocity to generate motion data. Another example non-camera sensor is an accelerometer, which is a device configured for measuring acceleration, which may also be used to determine velocity and distance traveled by appropriately integrating the measured acceleration. In some aspects, a gyroscope in an electronic image stabilization system (EIS) may be coupled to the sensor hub. In another example, a non-camera sensor may be a global positioning system (GPS) receiver, which is a device for processing satellite signals, such as through triangulation and other techniques, to determine a location of the device 100. The location may be tracked over time to determine additional motion information, such as velocity and acceleration. The data from one or more sensors may be accumulated as motion data by the sensor hub 150. One or more of the acceleration, velocity, and/or distance may be included in motion data provided by the sensor hub 150 to other components of the device 100, including the ISP 112 and/or the processor 104.

The ISP 112 may receive captured image data. In one embodiment, a local bus connection couples the ISP 112 to the first image sensor 101 and second image sensor 102 of a first camera 103 and second camera 105, respectively. In another embodiment, a wire interface couples the ISP 112 to an external image sensor. In a further embodiment, a wireless interface couples the ISP 112 to the first image sensor 101 or second image sensor 102.

The first image sensor 101 and the second image sensor 102 are configured to capture image data representing a scene in the field of view of the first camera 103 and second camera 105, respectively. In some embodiments, the first camera 103 and/or second camera 105 output analog data, which is converted by an analog front end (AFE) and/or an analog-to-digital converter (ADC) in the device 100 or embedded in the ISP 112. In some embodiments, the first camera 103 and/or second camera 105 output digital data. The digital image data may be formatted as one or more image frames, whether received from the first camera 103 and/or second camera 105 or converted from analog data received from the first camera 103 and/or second camera 105.

The first camera 103 may include the first image sensor 101 and a first lens 131. The second camera may include the second image sensor 102 and a second lens 132. Each of the first lens 131 and the second lens 132 may be controlled by an associated an autofocus (AF) algorithm (e.g., AF 133) executing in the ISP 112, which adjusts the first lens 131 and the second lens 132 to focus on a particular focal plane located at a certain scene depth. The AF 133 may be assisted by depth data received from depth sensor 140. The first lens 131 and the second lens 132 focus light at the first image sensor 101 and second image sensor 102, respectively, through one or more apertures for receiving light, one or more shutters for blocking light when outside an exposure window, and/or one or more color filter arrays (CFAs) for filtering light outside of specific frequency ranges. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors.

Each of the first camera 103 and second camera 105 may be configured through hardware configuration and/or software settings to obtain different, but overlapping, field of views. In some configurations, the cameras are configured with different lenses with different magnification ratios that result in different fields of view for capturing different representations of the scene. The cameras may be configured such that a UW camera has a larger FOV than a W camera, which has a larger FOV than a T camera, which has a larger FOV than a UT camera. For example, a camera configured for wide FOV may capture fields of view in the range of 64-84 degrees, a camera configured for ultra-side FOV may capture fields of view in the range of 100-140 degrees, a camera configured for tele FOV may capture fields of view in the range of 10-30 degrees, and a camera configured for ultra-tele FOV may capture fields of view in the range of 1-8 degrees.

In some embodiments, one or more of the first camera 103 and/or second camera 105 may be a variable aperture (VA) camera in which the aperture can be adjusted to set a particular aperture size. Example aperture sizes include f/2.0, f/2.8, f/3.2, f/8.0, etc. Larger aperture values correspond to smaller aperture sizes, and smaller aperture values correspond to larger aperture sizes. A variable aperture (VA) camera may have different characteristics that produced different representations of a scene based on a current aperture size. For example, a VA camera may capture image data with a depth of focus (DOF) corresponding to a current aperture size set for the VA camera.

The ISP 112 processes image frames captured by the first camera 103 and second camera 105. While FIG. 1 illustrates the device 100 as including first camera 103 and second camera 105, any number (e.g., one, two, three, four, five, six, etc.) of cameras may be coupled to the ISP 112. In some aspects, depth sensors such as depth sensor 140 may be coupled to the ISP 112. Output from the depth sensor 140 may be processed in a similar manner to that of first camera 103 and second camera 105. Examples of depth sensor 140 include active sensors, including one or more of indirect Time of Flight (iToF), direct Time of Flight (dToF), light detection and ranging (Lidar), mmWave, radio detection and ranging (Radar), and/or hybrid depth sensors, such as structured light sensors. In embodiments without a depth sensor 140, similar information regarding depth of objects or a depth map may be determined from the disparity between first camera 103 and second camera 105, such as by using a depth-from-disparity algorithm, a depth-from-stereo algorithm, phase detection auto-focus (PDAF) sensors, or the like. In addition, any number of additional image sensors or image signal processors may exist for the device 100.

In some embodiments, the ISP 112 may execute instructions from a memory, such as instructions 108 from the memory 106, instructions stored in a separate memory coupled to or included in the ISP 112, or instructions provided by the processor 104. In addition, or in the alternative, the ISP 112 may include specific hardware (such as one or more integrated circuits (ICs)) configured to perform one or more operations described in the present disclosure. For example, the ISP 112 may include image front ends (e.g., IFE 135), image post-processing engines (e.g., IPE 136), auto exposure compensation (AEC) engines (e.g., AEC 134), and/or one or more engines for video analytics (e.g., EVA 137). An image pipeline may be formed by a sequence of one or more of the IFE 135, IPE 136, and/or EVA 137. In some embodiments, the image pipeline may be reconfigurable in the ISP 112 by changing connections between the IFE 135, IPE 136, and/or EVA 137. The AF 133, AEC 134, IFE 135, IPE 136, and EVA 137 may each include application-specific circuitry, be embodied as software or firmware executed by the ISP 112, and/or a combination of hardware and software or firmware executing on the ISP 112.

The memory 106 may include a non-transient or non-transitory computer readable medium storing computer-executable instructions as instructions 108 to perform all or a portion of one or more operations described in this disclosure. The instructions 108 may include a camera application (or other suitable application such as a messaging application) to be executed by the device 100 for photography or videography. The instructions 108 may also include other applications or programs executed by the device 100, such as an operating system and applications other than for image or video generation. Execution of the camera application, such as by the processor 104, may cause the device 100 to record images using the first camera 103 and/or second camera 105 and the ISP 112.

In addition to instructions 108, the memory 106 may also store image frames. The image frames may be output image frames stored by the ISP 112. The output image frames may be accessed by the processor 104 for further operations. In some embodiments, the device 100 does not include the memory 106. For example, the device 100 may be a circuit including the ISP 112, and the memory may be outside the device 100. The device 100 may be coupled to an external memory and configured to access the memory for writing output image frames for display or long-term storage. In some embodiments, the device 100 is a system-on-chip (SoC) that incorporates the ISP 112, the processor 104, the sensor hub 150, the memory 106, and/or components 116 into a single package.

In some embodiments, at least one of the ISP 112 or the processor 104 executes instructions to perform various operations described herein, including HDR image processing. For example, execution of the instructions can instruct the ISP 112 to begin or end capturing an image frame or a sequence of image frames, in which the capture includes correction as described in embodiments herein. In some embodiments, the processor 104 may include one or more general-purpose processor cores 104A-N capable of executing instructions to control operation of the ISP 112. For example, the cores 104A-N may execute a camera application (or other suitable application for generating images or video) stored in the memory 106 that activate or deactivate the ISP 112 for capturing image frames and/or control the ISP 112 in the application of HDR processing to the image frames. The operations of the cores 104A-N and ISP 112 may be based on user input. For example, a camera application executing on processor 104 may receive a user command to begin a video preview display upon which a video comprising a sequence of image frames is captured and processed from first camera 103 and/or the second camera 105 through the ISP 112 for display and/or storage. Image processing to determine "output" or "corrected" image frames, such as according to techniques described herein, may be applied to one or more image frames in the sequence.

In some embodiments, the processor 104 may include ICs or other hardware (e.g., an artificial intelligence (AI) engine such as AI engine 124 or other co-processor) to offload certain tasks from the cores 104A-N. The AI engine 124 may be used to offload tasks related to, for example, face detection and/or object recognition performed using machine learning (ML) or artificial intelligence (AI). The AI engine 124 may be referred to as an Artificial Intelligence Processing Unit (AI PU). The AI engine 124 may include hardware configured to perform and accelerate convolution operations involved in executing machine learning algorithms, such as by executing predictive models such as artificial neural networks (ANNs) (including multilayer feedforward neural networks (MLFFNN), the recurrent neural networks (RNN), and/or the radial basis functions (RBF)). The ANN executed by the AI engine 124 may access predefined training weights for performing operations on user data. The ANN may alternatively be trained during operation of the image capture device 100, such as through reinforcement training, supervised training, and/or unsupervised training. In some other embodiments, the device 100 does not include the processor 104, such as when all of the described functionality is configured in the ISP 112.

In some embodiments, the display 114 may include one or more suitable displays or screens allowing for user interaction and/or to present items to the user, such as a preview of the output of the first camera 103 and/or second camera 105. In some embodiments, the display 114 is a touch-sensitive display. The input/output (I/O) components, such as components 116, may be or include any suitable mechanism, interface, or device to receive input (such as commands) from the user and to provide output to the user through the display 114. For example, the components 116 may include (but are not limited to) a graphical user interface (GUI), a keyboard, a mouse, a microphone, speakers, a squeezable bezel, one or more buttons (such as a power button), a slider, a toggle, or a switch.

While shown to be coupled to each other via the processor 104, components (such as the processor 104, the memory 106, the ISP 112, the display 114, and the components 116) may be coupled to each another in other various arrangements, such as via one or more local buses, which are not shown for simplicity. One example of a bus for interconnecting the components is a peripheral component interface (PCI) express (PCIe) bus.

While the ISP 112 is illustrated as separate from the processor 104, the ISP 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

The exemplary image capture device of FIG. 1 may be operated to obtain improved images by processing image frames to obtain high dynamic range (HDR) representations of scenes. One example method of operating one or more cameras, such as first camera 103 and/or second camera 105, is shown in FIG. 2 and described below.

Figure 2:
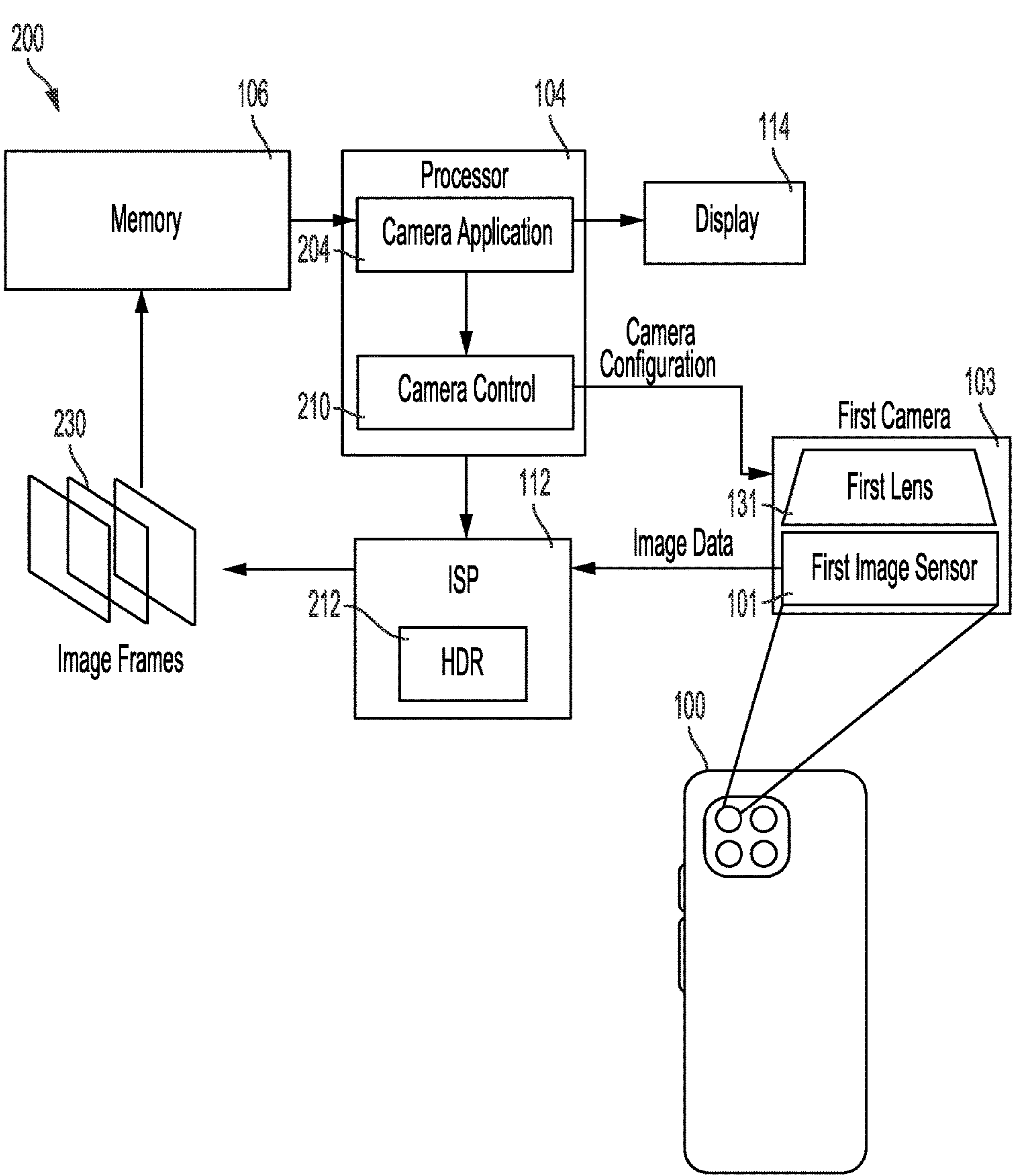
FIG. 2 is a block diagram illustrating an example data flow path for image data processing in an image capture device according to one or more embodiments of the disclosure.

FIG. 2 is a block diagram illustrating an example data flow path for image data processing in an image capture device according to one or more embodiments of the disclosures. Processor 104 of system 200 may communicate with ISP 112 through a bi-directional bus and/or separate control and data lines. The processor 104 may control the first camera 103 through camera control 210. The camera control 210 may be a camera driver executed by the processor 104 for configuring the first camera 103, such as to active or deactivate image capture, configure exposure settings, and/or configure aperture size. Camera control 210 may be managed by a camera application 204 executing on the processor 104. The camera application 204 provides settings accessible to a user such that a user can specify individual camera settings or select a profile with corresponding camera settings. Camera control 210 communicates with the first camera 103 to configure the first camera 103 in accordance with commands received from the camera application 204. The camera application 204 may be, for example, a photography application, a document scanning application, a messaging application, or other application that processes image data acquired from the first camera 103. The camera application 204 may configure the first camera 103 for HDR image capture, such as to configure a series of exposure-bracket captures to generate a set of image frames with different exposure durations.

The camera configuration may include parameters that specify, for example, a frame rate, an image resolution, a readout duration, an exposure level, an aspect ratio, an aperture size, etc. The first camera 103 may apply the camera configuration and obtain image data representing a scene using the camera configuration. In some embodiments, the camera configuration may be adjusted to obtain different representations of the scene. For example, the processor 104 may execute a camera application 204 to instruct the first camera 103, through camera control 210, to set a first camera configuration for the first camera 103, to obtain first image data from the first camera 103 operating in the first camera configuration, to instruct the first camera 103 to set a second camera configuration for the first camera 103, and to obtain second image data from the first camera 103 operating in the second camera configuration.

In some embodiments in which the first camera 103 is a variable aperture (VA) camera system, the processor 104 may execute a camera application 204 to instruct the first camera 103 to configure to a first aperture size, obtain first image data from the first camera 103, instruct the first camera 103 to configure to a second aperture size, and obtain second image data from the first camera 103. The reconfiguration of the aperture and obtaining of the first and second image data may occur with little or no change in the scene captured at the first aperture size and the second aperture size. Example aperture sizes are f/2.0, f/2.8, f/3.2, f/8.0, etc. Larger aperture values correspond to smaller aperture sizes, and smaller aperture values correspond to larger aperture sizes. That is, f/2.0 corresponds to a larger aperture size than f/8.0.

The image data received from the first camera 103 may be processed in one or more blocks of the ISP 112 to determine output image frames 230 that may be stored in memory 106 and/or otherwise provided to the processor 104. The processor 104 may further process the image data to apply effects to the output image frames 230. Effects may include Bokeh, lighting, color casting, and/or high dynamic range (HDR) merging. In some embodiments, the effects may be applied in the ISP 112.

The output image frames 230 by the ISP 112 may include representations of the scene improved by aspects of this disclosure, such that higher dynamic range is obtained, which captures additional detail in dark and light portions of the scene. The processor 104 may display these output image frames 230 to a user, and the improvements provided by the described processing implemented in the ISP 112 and/or processor 104 improve the image quality and the user experience by improving the representation of the scene. For example, HDR processing module 212 in the ISP 112 may correct the image data received from the first camera 103 when determining the output image frames 230.

Figure 3:
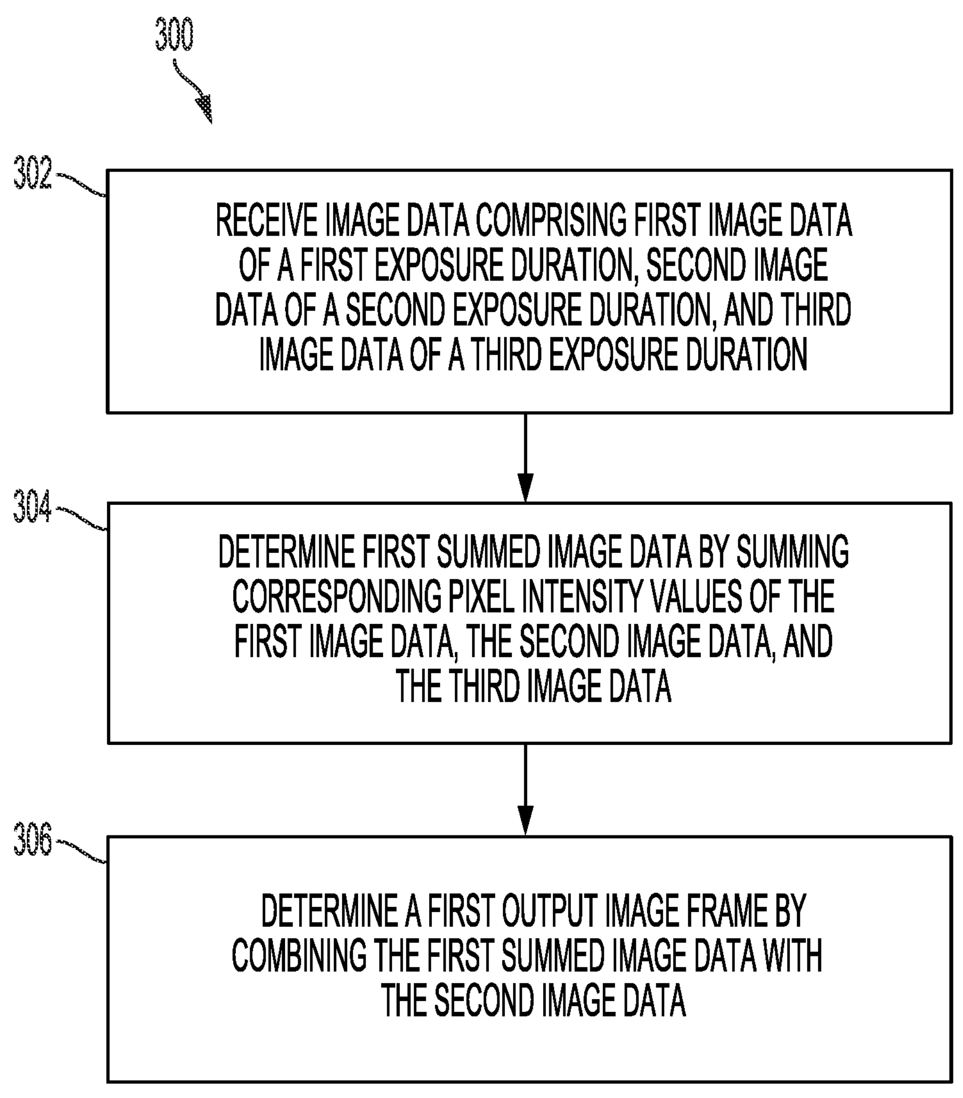
FIG. 3 shows a flow chart of an example method for processing image data to obtain a high dynamic range (HDR) image frame according to some embodiments of the disclosure.

The system 200 of FIG. 2 may be configured to perform the operations described with reference to FIG. 3 to determine output image frames 230. FIG. 3 shows a flow chart of an example method 300 for processing image data to obtain a high dynamic range (HDR) image frame according to some embodiments of the disclosure. The HDR processing techniques described with reference to FIG. 3 may obtain an improved digital representation of a scene captured using a staggered HDR (sHDR) capture or other techniques. Methods of processing image data described with reference to FIG. 3 result in a photograph or video with higher image quality (IQ). Each of the operations described with reference to FIG. 3 may be performed by one or a combination of the processor 104 (including cores 104A-N and/or AI engine 124) and/or the ISP 112.

At block 302, image data is received from the image sensor. The image data may include first image data of a first exposure duration, second image data of a second exposure duration, and third image data of a third exposure duration. The first exposure duration may be longer than the second exposure duration, and the third exposure duration may be longer than the second exposure duration. In some embodiments, the first exposure duration is equal to the third exposure duration. Image data acquired in this manner may have a temporal center of the second image data that is equally spaced, in time, between a temporal center of the first image data and a temporal center of the third image data.

Figure 4:
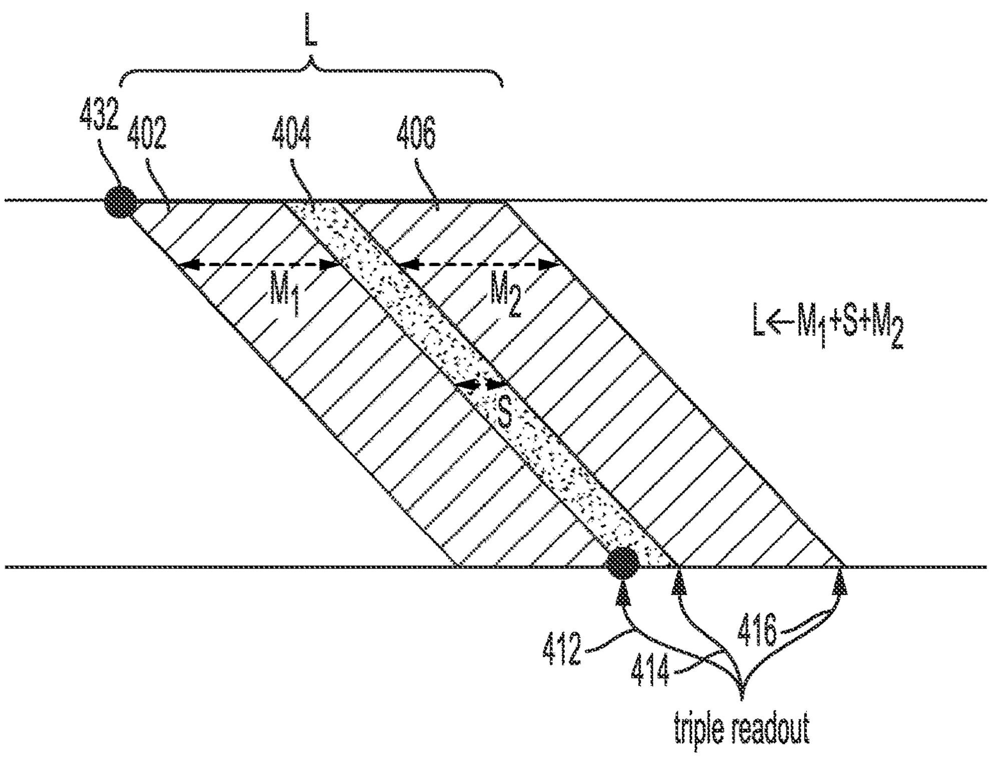
FIG. 4 is a timing diagram for an example image capture operation according to aspects of this disclosure.

An example illustration of the data capture arrangement resulting in the image data received at block 302 according to a staggered HDR configuration is shown in FIG. 4. FIG. 4 is a timing diagram for an example image capture operation according to aspects of this disclosure. The x-axis illustrates advancing time along both the top and bottom x-axes. A first image frame 402 is captured with an exposure duration of $M_1$. Subsequent to the first image frame 402, a second image frame 404 is captured with an exposure duration of S, and a third image frame 406 is captured with an exposure duration of $M_2$. The timing of the capture for each of the image frames 402, 404, and 406 are similarly shown. For example, with regard to first image frame 402, a time 432 begins the image capture operation on the image sensor and a time 412 indicates an end of the image capture operation for the first image frame 402 on the image sensor. Times 414 and 416 correspond to end of the image capture operation for the second image frame 404 and third image frame 406.

The illustration of image capture operations for image frames 404 and 406 are similarly shown in FIG. 4. After capturing the three image frames 402, 404, and 406, a fourth image frame may be determined by summing the image frames 402, 404, and 406, with the fourth image frame having a corresponding exposure duration of L that is the sum of $M_1$, S, and $M_2$. The temporal center of the fourth image frame with the L exposure duration is the temporal center of the second image frame 404, which is a temporal center that is centered in the second image frame 404 and also equidistant from temporal centers of the first image frame 402 and the third image frame 406.

The image data may be received, at block 302, for example, from a bus coupled to the first camera 103 or from an analog front end (AFE) coupled to the first camera 103. The image data may alternatively be received from a wireless camera, in which the image data is received through one or more of the WAN adaptor 152, the LAN adaptor 153, and/or the PAN adaptor 154. The image data may alternatively be received from a memory location or a network storage location, such as when the image data was previously captured and is now retrieved from memory 106 and/or a remote location through one or more of the WAN adaptor 152, the LAN adaptor 153, and/or the PAN adaptor 154. In some embodiments, the capture of image data may be initiated by a camera application executing on the processor 104, which causes camera control 210 to activate capture of image data by the first camera 103. The image data retrieved at block 302 may be then processed by the ISP 112 and/or processor 104 or other means for processing image data according to the operations described in one or more of the following blocks.

The image data received at block 302 may be captured while the image sensor is configured with the camera configuration described with reference to FIG. 2. In this embodiment, the method may include, prior to block 302, configuring, by the at least one processor, an image sensor to capture the first image data at the first exposure duration, the second image data at the second exposure duration, and the third image data at the third exposure duration. The camera configuration may configure the image sensor with a first exposure duration that may be longer than the second exposure duration; and a third exposure duration that may be longer than the second exposure duration.

After acquiring the various image data corresponding to different image frames with specific exposure durations organized to obtain temporally-aligned image data, the image frames may be processed to obtain an output HDR image frame. The HDR processing may include operations described with reference to blocks 304 and 306.

At block 304, the method may include determining, by the at least one processor, a first summed image data by summing corresponding pixel intensity values of the first image data, the second image data, and the third image data. This summation forms a fourth image frame that corresponds to a long exposure image frame.

At block 306, the method may include determining, by the at least one processor, a first output image frame by combining the first summed image data (which is a summation of the first, second, and third image frames) with the second image data. The temporal center of the fourth image frame is the same temporal center as the temporal center of the second image data. Thus, in some embodiments, no alignment operation is applied to the fourth image data (the long-exposure image frame) or the second image data (the short-exposure image frame) when combining the two image frames. The output may be an image frame enhanced by exposure bracketing, such as to provide improved dynamic range, low-light multi-frame imaging, or high-motion photography.

An example operation performed according to the method shown in FIG. 3 is shown as follows for image frames 402, 404, and 406 corresponding to inputs $M_1$, S, and $M_2$:

```
input (M1, S, M2)
for u in [0, L·height):
  for v in [0, L·width):
    L(u,v)←M1(u,v)+S(u,v)+M2(u,v)
HDR_fusion (L, S)
```

Although one example of image processing is shown with $M_1>S$ and $M_2>S$, other embodiments of the image processing techniques described herein may include other exposure durations for the exposure bracketing of the input image frames $M_1$, S, and $M_2$. In another such embodiment, $M_1<S$ and $M_2<S$ with $M_1=M_2$ such that the S image frame is temporally-centered between $M_1$ and $M_2$.

Figure 5:
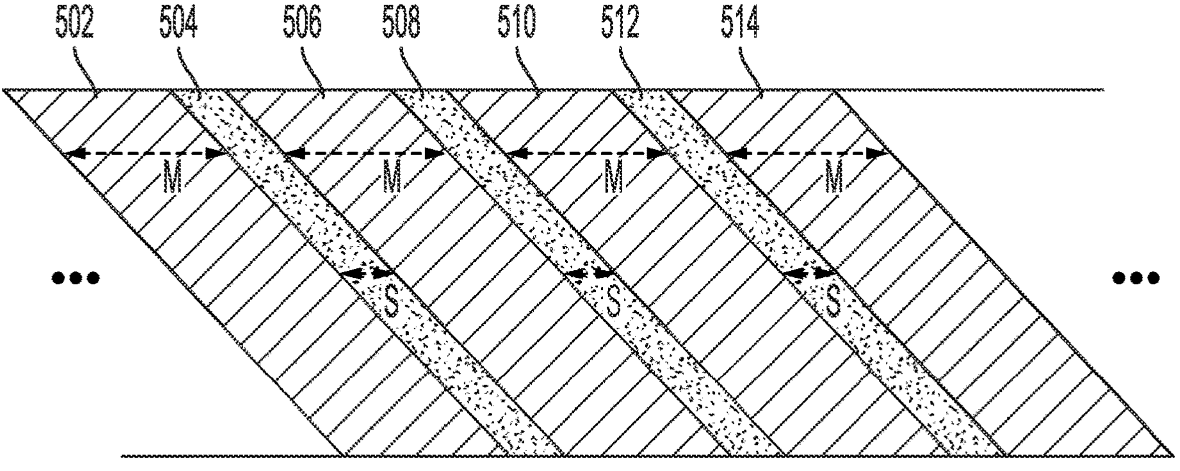
FIG. 5 is a timing diagram for an example image capture operation with alternating medium and short image frames according to aspects of this disclosure.

Additional image data may be processed in obtaining the output HDR image frame, such as by configuring the image sensor to capture additional image data corresponding to fourth image data, fifth image data, and/or further image data. One example of capturing such further image data is shown in FIG. 5. FIG. 5 is a timing diagram for an example image capture operation with alternating medium and short image frames according to aspects of this disclosure. The image capture operation of which one example is shown in FIG. 5 may include capturing alternating image frames of medium and short exposure durations. As shown, the image capture may involve zero shutter lag, in which the image frames are captured back-to-back, but other embodiments may involve some shutter lag or another predetermined delay between image captures or sets of image captures.

The fourth exposure duration of the fourth image frame 508 may be equal to the second exposure duration of the second image frame 504; and the fifth exposure duration of the fifth image frame 510 may be equal to the third exposure duration of the third image frame 506, which is equal to the first exposure duration of the first image frame 502. A temporal center of the fourth image data may be equally spaced in time between a temporal center of the third image data and a temporal center of the fifth image data.

The image capture operation shown may continuously capture image frames as part of a preview operation. When a shutter is activated, the most recent triplet of image frames may be processed according to one or more techniques as described with reference to FIG. 3. For example, the image capture device may acquire first image frame 502, second image frame 504, third image frame 506, fourth image frame 508, fifth image frame 510, sixth image frame 512, and seventh image frame 514 prior to activation of a shutter. The image frames 510, 512, and 514 may be input to the operation of FIG. 3 to determine an output HDR image frame, in which the summation of image frames 510, 512, and 514 is the fourth image frame that may be combined with the image frame 512 to obtain the output HDR image frame.

Figure 6:
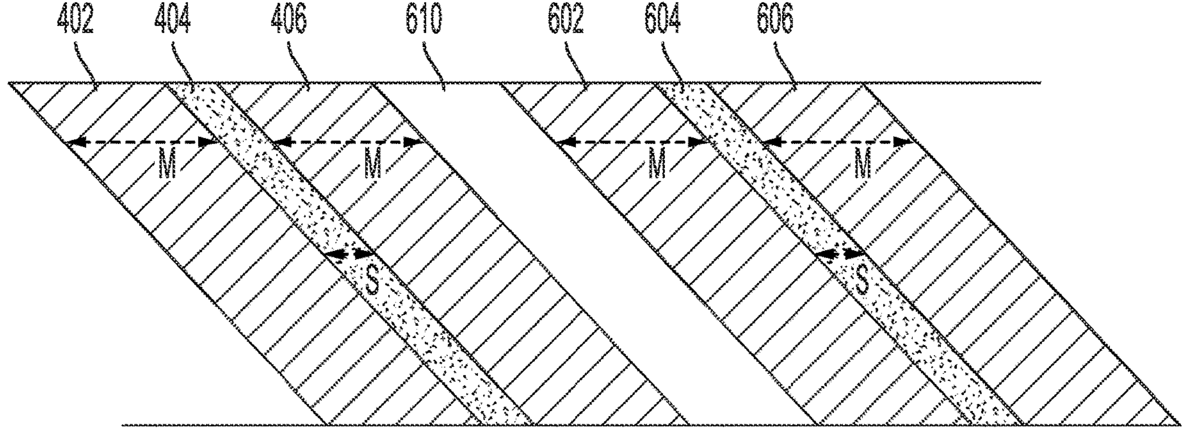
FIG. 6 is a timing diagram for an example image capture operation with grouped triplets of image frames according to aspects of this disclosure.

Another example configuration for capturing image data is shown in FIG. 6. FIG. 6 is a timing diagram for an example image capture operation with grouped triplets of image frames according to aspects of this disclosure. The image capture operation of FIG. 6 groups the capture of image frames into triplets, in which the middle, short-exposure image frame localizes the triplet in space and time by anchoring the triplet. Any one of the triplets may be processed and used as input to any one of the methods described with reference to FIG. 3. Referring to FIG. 6, image frames 402, 404, and 406 are captured as shown in FIG. 4. Additional triplets are subsequently captured, such as image frames 602, 604, and 606, after delay 610, with equal or different exposure times as the triplet of image frames 402, 404, and 406. The triplets may be continuously captured as part of a preview or live image, and the most recent triplet is input to HDR processing logic for determining an output HDR image frame when a shutter is depressed.

With the capture configuration of FIG. 6, the received data of block 302 may further include receiving, by the at least one processor, a fourth image data, a fifth image data, and a sixth image data. The processing of the image data may include determining, by the at least one processor, a second summed image data by summing corresponding pixel intensity values of the fourth image data, the fifth image data, and the sixth image data; and determining, by the at least one processor, a second output image frame by combining the second summed image data with the fifth image data. In some embodiments, the HDR output frame may be the result of combining two or more HDR image frames generated from two or more triplets. For example, the method of FIG. 3 may include determining, by the at least one processor, a third output image frame by combining the first output image frame with the second output image frame.

Figure 7:
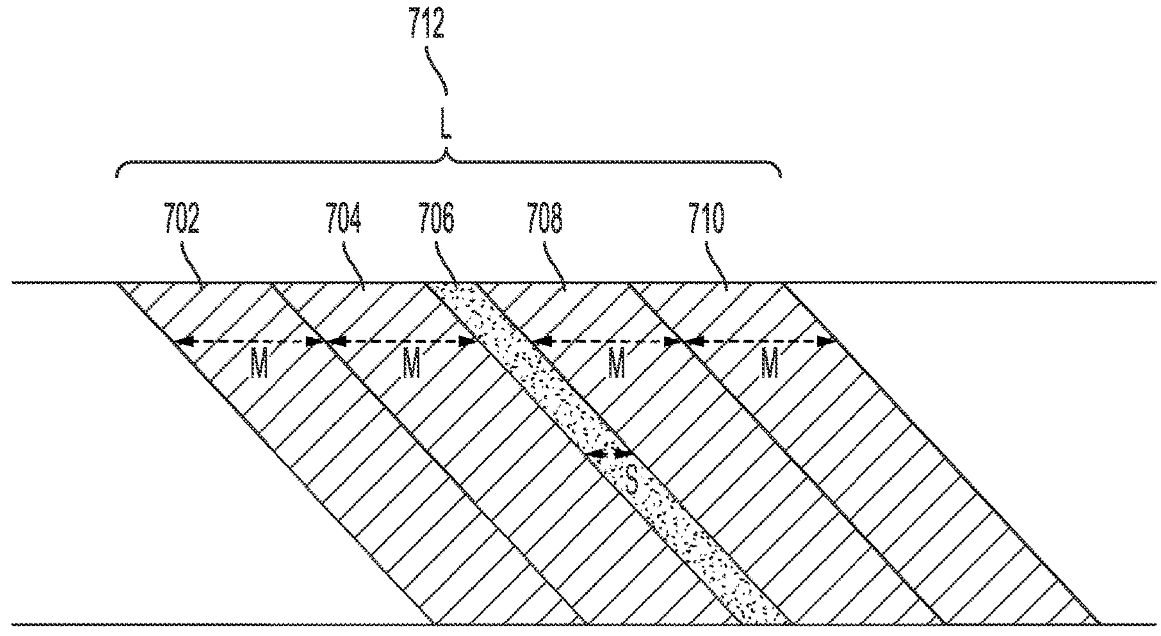
FIG. 7 is a timing diagram for an example image capture operation with a quintuplet of exposures according to aspects of this disclosure.

Another example configuration for capturing image data is shown in FIG. 7. The image capture operation of FIG. 7 extends the triplets shown in, for example, FIG. 4 and FIG. 6, to include additional image frames. The set of image frames may be processed and used as input to any one of the methods described with reference to FIG. 3. FIG. 7 is a timing diagram for an example image capture operation with a quintuplet of exposures according to aspects of this disclosure. Referring to FIG. 7, image frames 702, 704, 706, 708, and 710 are captured by the image capture device. In the example shown, the image frames 702, 704, 708, and 710 have equal exposure durations corresponding to exposure duration M, and the image frame 706 is captured with an exposure duration S.

A long-exposure image frame 712 may be determined by summing together the image frames 702, 704, 706, 708, and 710. A medium-duration image frame may be determined by summing together the image frames 704, 706, and 708. Although image frames 702 and 704 are shown as equal duration to image frames 708 and 710, the image frames may have different durations as long as the durations are symmetric such that the temporal center of the long image frame 712 remains the temporal center of the image frame 706. For example, image frames 702 and 710 may have a duration of $M_2$ and image frames 704 and 708 may have a duration of $M_1$.

The image data of the capture operation shown in FIG. 7 may be input to one or more of the methods described with reference to FIG. 3. For example, the long image frame 712 may be determined by an operation corresponding to block 304, and the output HDR image frame may be determined by an operation corresponding to block 306 that combines the long image frame 712 with the short image frame 706.

Figure 8:
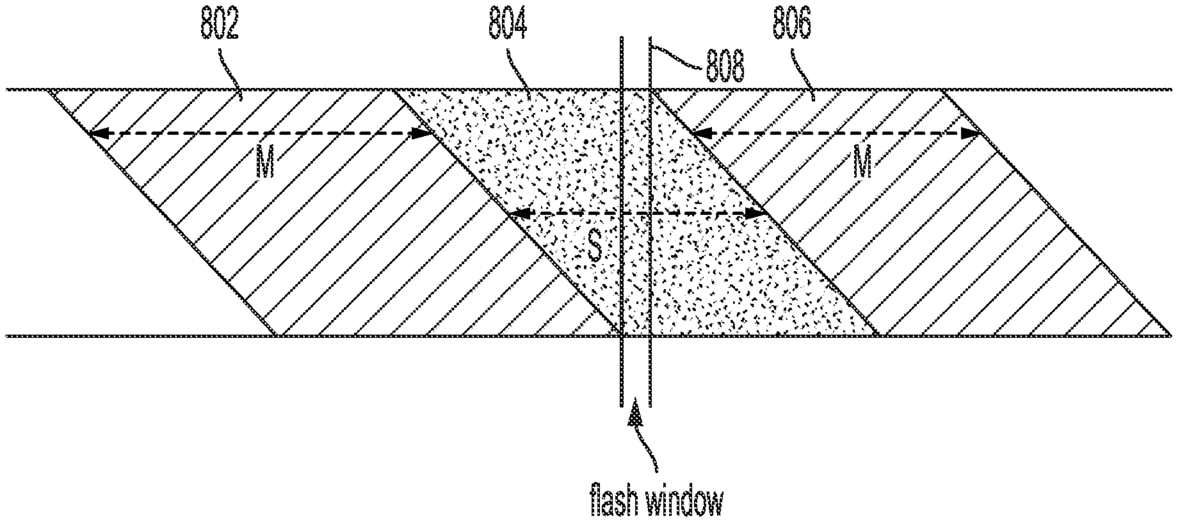
FIG. 8 is a timing diagram for an example image capture operation with flash operation according to aspects of this disclosure.

Another example configuration for capturing image data is shown in FIG. 8. The image capture operation of FIG. 8 extends the image capture operation to include a flash for illuminating details as part of capturing a short exposure image frame. FIG. 8 is a timing diagram for an example image capture operation with flash operation according to aspects of this disclosure. A triplet of image frames 802, 804, and 806 is captured with corresponding exposure durations of M, S, and M. The duration of image frame 804 may be long enough to provide a time window 808 for a flash to activate. In such embodiments, the camera configuration provided to the first camera may also include an instruction to activate the flash as part of the image capture process. The image frames 802 and 806 may form a triplet, along with image frame 804, which may be input to one of the methods described with reference to FIG. 3 for determining an output HDR image frame.

The HDR processing described with reference to FIG. 3, FIG. 4, FIG. 5, FIG. 6, FIG. 7, and FIG. 8 demonstrate an example involving staggered HDR (sHDR) capture techniques. Aspects of this disclosure apply to other HDR capture techniques. For example, similar techniques applied to quad HDR (qHDR) capture techniques are illustrated with reference to FIG. 9 and FIG. 10.

Figure 9:
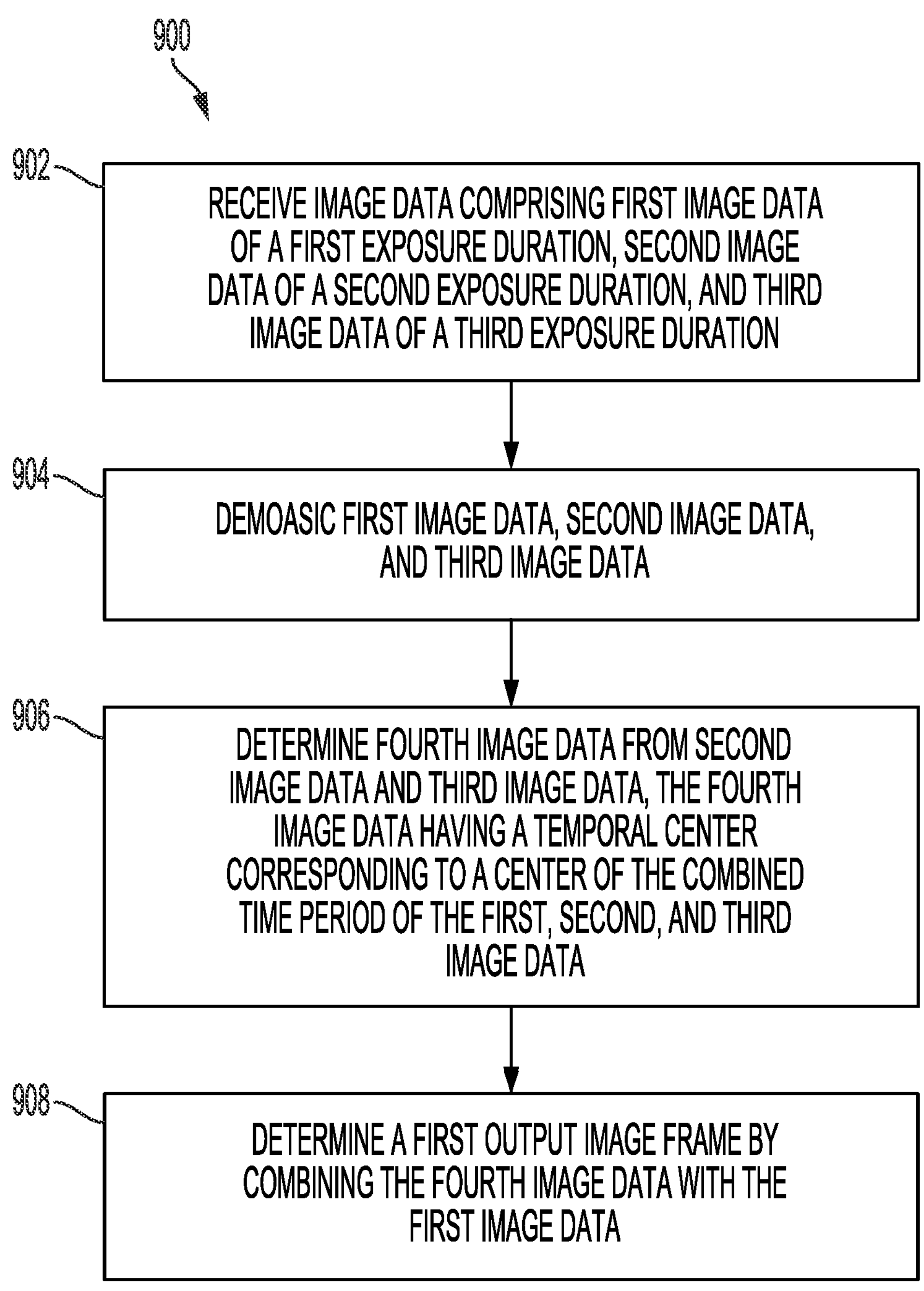
FIG. 9 shows a flow chart of an example method for processing image data to obtain a high dynamic range (HDR) image frame according to some aspects of the disclosure.
Figure 10:
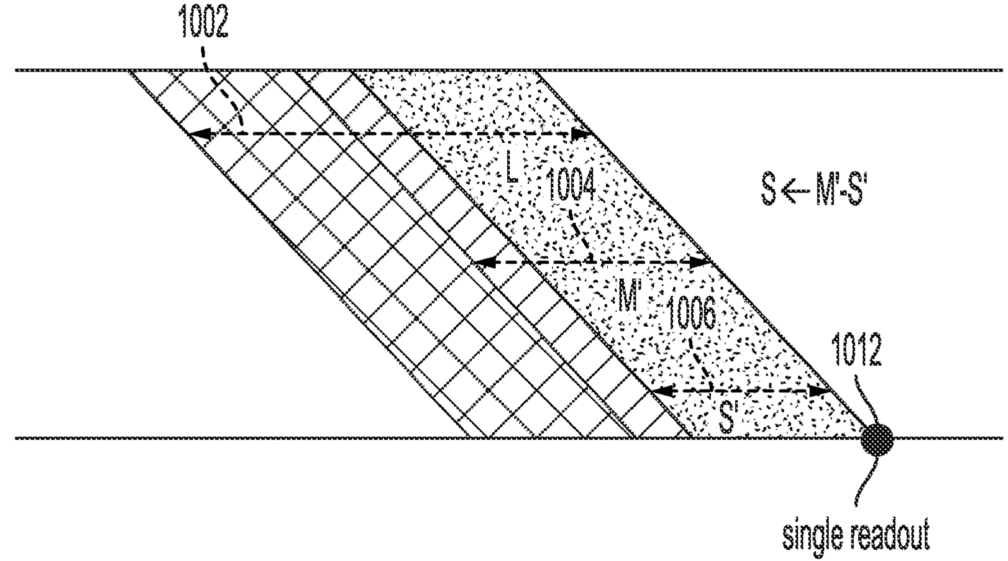
FIG. 10 is a timing diagram for an example image capture operation according to aspects of this disclosure.

FIG. 9 shows a flow chart of an example method for processing image data to obtain a high dynamic range (HDR) image frame according to some aspects of the disclosure. A method 900 begins at block 902 with receiving first image data, second image data, and third image data, similar to that of block 302 of FIG. 3. The first, second, and third image data may be captured from a qHDR capture operation as described in FIG. 10. FIG. 10 is a timing diagram for an example image capture operation according to aspects of this disclosure. A single readout may be performed at time 1012, in which the single readout from the image sensor provides first image data 1002 corresponding to exposure duration L, second image data 1004 corresponding to exposure duration M', and third image data 1006 corresponding to exposure duration S'.

At block 904, the first, second, and third image data are demosaiced to separate red, green, and blue channels from the respective quad-CFA image data.

At block 906, fourth image data is determined from the second image data and the third image data, such as by subtracting the third image data from the second image data. The resulting operation obtains an image frame corresponding to a short exposure duration that is temporally centered within the image data 1002.

At block 908, a first output HDR image frame is determined by combining the fourth image data with the first image data. The first image data corresponds to a long exposure duration, and the fourth image data corresponds to a short exposure duration temporally centered within the long exposure duration. The temporal alignment between the fourth and first image data allows combining the image data without an alignment operation. The output may be an image frame enhanced by exposure bracketing, such as to provide improved dynamic range, low-light multi-frame imaging, or high-motion photography. In some embodiments, the exposure durations for the first, second, and third image data are programmed in the camera configuration to obtain he temporal alignment of the fourth image data and the first image data. For example, the exposure duration of image data 1002, 1004, and 1006 may be determined to obtain a symmetric exposure structures for the L, M, and S frames, such that the exposure duration of L and S are equal, the exposure duration of L>S and M>S, or the exposure duration of L<S and M<S.

An example operation performed according to the method shown in FIG. 9 is shown as follows for image data 1002, 1004, and 1006 corresponding to inputs L, M', and S':

```
input (L, M', S')
L←demosaic(L)
M'←demosaic(M')
S'←demosaic(S')
for u in [0, S·height):
  for v in [0, S·width):
    S(u,v)←M'(u,v)−S'(u,v)
HDR_fusion (L, S)
```

Although one example of image processing is shown with $M_1>S$ and $M_2>S$, other embodiments of the image processing techniques described herein may include other exposure durations for the exposure bracketing of the input image frames $M_1$, S, and $M_2$. In another such embodiment, $M_1<S$ and $M_2<S$ with $M_1=M_2$ such that the S image frame is temporally-centered between $M_1$ and $M_2$.

Figure 11:
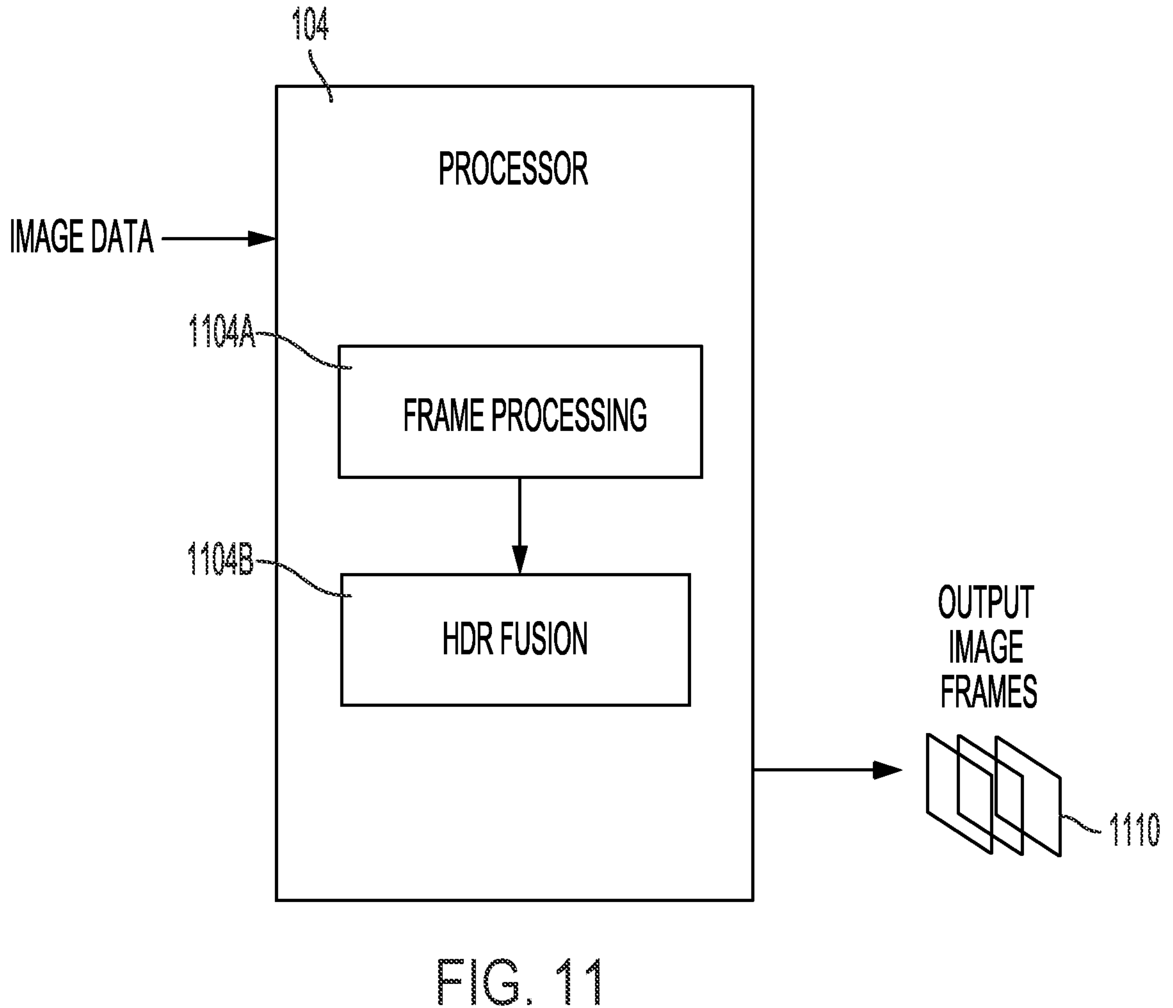
FIG. 11 is a block diagram illustrating an example processor configuration for image data processing in an image capture device according to one or more embodiments of the disclosure.

FIG. 11 is a block diagram illustrating an example processor configuration for image data processing in an image capture device according to one or more embodiments of the disclosure. The processor 104 (e.g., one or more processor cores, graphics processing unit, image signal processor, digital signal processor, neural signal processor, or a combination thereof), or other processing circuitry, may be configured to operate on image data to perform one or more operations of the methods described with reference to FIG. 3 and/or FIG. 9. The image data may be processed to determine one or more output HDR image frames 1110. The processor 104 may be configured with frame processing 1104A processing logic, which may include summing, subtracting, demosaicing, or otherwise processing image data to obtain two image frames that will be fused to determine the output HDR image frames 1110. The two image frames are provided to HDR fusion 1104B processing logic. The HDR fusion 1104B may combine two image frames by determining, for each pixel of the output HDR image frame 1110, a pixel value from either the first image frame or the second image frame or a combination of the pixel values of the corresponding pixel in the first and second image frames. For example, when a pixel is determined to be in a shadow region (e.g., intensity below a threshold level) the corresponding pixel of the longer duration image frame may be selected for the output HDR image frame, and when a pixel is determined to be in a highlight region (e.g., intensity above a threshold level) the corresponding pixel of the short duration image frame may be selected for the output HDR image frame. In some embodiments, a tone-mapping operation may be used to combine corresponding pixel values of the first and second image frames for determining the pixel value of the output HDR image frame 1110.

The processor 104 receives first image data and second image data. In some embodiments, the first image data may be received directly from the image sensor or a memory coupled to the image sensor. In some embodiments, the first image data may be retrieved from long-term storage, such as flash storage device or network location, storing a picture that was previously captured or generated.

In one or more aspects, techniques for supporting image processing may include additional aspects, such as any single aspect or any combination of aspects described below or in connection with one or more other processes or devices described elsewhere herein. In a first aspect, supporting image processing may include an apparatus configured to perform image processing in at least one processor (e.g., a CPU, GPU, DSP, NSP, ISP). The apparatus is further configured to perform operations to execute a method of image processing including receiving, by at least one processor, image data comprising first image data of a first exposure duration, second image data of a second exposure duration, and third image data of a third exposure duration, wherein the first exposure duration is equal to the third exposure duration; determining, by the at least one processor, fourth image data by subtracting corresponding pixel intensity values of the third image data from the second image data; and determining, by the at least one processor, a first output image frame by combining the fourth image data with the first image data.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, a temporal center of the fourth image data corresponds to a temporal center of the first image data.

In a third aspect, in combination with one or more of the first aspect or the second aspect, determining the fourth image data comprises determining fourth image data corresponding to a short-duration exposure temporally centered at a temporal center of the first image data.

In a fourth aspect, in combination with one or more of the first aspect through the third aspect, the steps of determining the first fourth image data and determining the first output image frame do not include spatial image alignment processing.

In a fifth aspect, in combination with one or more of the first aspect through the fourth aspect, the combining comprises executing an HDR fusion algorithm.

In a sixth aspect, in combination with one or more of the first aspect through the fifth aspect, the HDR fusion algorithm comprises selecting a corresponding pixel of the fourth image data when the pixel is in a highlight region; and selecting a corresponding pixel of the first image data when the pixel is in a shadow region.

In a seventh aspect, in combination with one or more of the first aspect through the sixth aspect, the method further includes configuring, by the at least one processor, an image sensor to capture the first image data at the first exposure duration, the second image data at the second exposure duration, and the third image data at the third exposure duration.

In an eighth aspect, in combination with one or more of the first aspect through the seventh aspect, the method further includes demosaicing the first image data, the second image data, and the third image data before determining the fourth image data.

In a ninth aspect, in combination with one or more of the first aspect through the eighth aspect, the first image data, the second image data, and the third image data are acquired in a single read-out of an image sensor.

In a tenth aspect, in combination with one or more of the first aspect through the ninth aspect, the first image data, the second image data, and the third image data are acquired during a quad HDR (qHDR) readout.

In an eleventh aspect, in combination with one or more of the first aspect through the tenth aspect, an apparatus includes a memory storing processor-readable code; and at least one processor coupled to the memory, the at least one processor configured to execute the processor-readable code to cause the at least one processor to perform operations including: receiving, by at least one processor, image data comprising first image data of a first exposure duration, second image data of a second exposure duration, and third image data of a third exposure duration, wherein the first exposure duration is equal to the third exposure duration; determining, by the at least one processor, fourth image data by subtracting corresponding pixel intensity values of the third image data from the second image data; and determining, by the at least one processor, a first output image frame by combining the fourth image data with the first image data.

In a twelfth aspect, in combination with one or more of the first aspect through the eleventh aspect, a temporal center of the fourth image data corresponds to a temporal center of the first image data.

In a thirteenth aspect, in combination with one or more of the first aspect through the twelfth aspect, determining the fourth image data comprises determining fourth image data corresponding to a short-duration exposure temporally centered at a temporal center of the first image data.

In a fourteenth aspect, in combination with one or more of the first aspect through the thirteenth aspect, the steps of determining the first fourth image data and determining the first output image frame do not include spatial image alignment processing.

In a fifteenth aspect, in combination with one or more of the first aspect through the fourteenth aspect, the combining comprises executing an HDR fusion algorithm.

In a sixteenth aspect, in combination with one or more of the first aspect through the fifteenth aspect, the HDR fusion algorithm comprises: for each pixel of the first output image frame: selecting a corresponding pixel of the fourth image data when the pixel is in a highlight region; and selecting a corresponding pixel of the first image data when the pixel is in a shadow region.

In a seventeenth aspect, in combination with one or more of the first aspect through the sixteenth aspect, the at least one processor is further configured to perform operations including: configuring, by the at least one processor, an image sensor to capture the first image data at the first exposure duration, the second image data at the second exposure duration, and the third image data at the third exposure duration.

In an eighteenth aspect, in combination with one or more of the first aspect through the seventeenth aspect, the at least one processor is further configured to perform operations including demosaicing the first image data, the second image data, and the third image data before determining the fourth image data.

In a nineteenth aspect, in combination with one or more of the first aspect through the eighteenth aspect, the first image data, the second image data, and the third image data are acquired in a single read-out of an image sensor.

In a twentieth aspect, in combination with one or more of the first aspect through the nineteenth aspect, the first image data, the second image data, and the third image data are acquired during a quad HDR (qHDR) readout.

In a twenty-first aspect, in combination with one or more of the first aspect through the twentieth aspect, the apparatus includes an image sensor coupled to the at least one processor.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including, coupled to, or otherwise processing data from one, two, or more image sensors capable of capturing image frames (or "frames"). The terms "output image frame," "modified image frame," and "corrected image frame" may refer to an image frame that has been processed by any of the disclosed techniques to adjust raw image data received from an image sensor. Further, aspects of the disclosed techniques may be implemented for processing image data received from image sensors of the same or different capabilities and characteristics (such as resolution, shutter speed, or sensor type). Further, aspects of the disclosed techniques may be implemented in devices for processing image data, whether or not the device includes or is coupled to image sensors. For example, the disclosed techniques may include operations performed by processing devices in a cloud computing system that retrieve image data for processing that was previously recorded by a separate device having image sensors.

Unless specifically stated otherwise as apparent from the following discussions, it is appreciated that throughout the present application, discussions using terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices. The use of different terms referring to actions or processes of a computer system does not necessarily indicate different operations. For example, "determining" data may refer to "generating" data. As another example, "determining" data may refer to "retrieving" data.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU), computer vision processor (CVP), or neural signal processor (NSP)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to the Figures referenced above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 3 and 4 may be combined with one or more blocks (or operations) described with reference to another of the figures. For example, one or more blocks (or operations) of FIG. 3 may be combined with one or more blocks (or operations) of FIGS. 1-2. As another example, one or more blocks associated with FIG. 11 may be combined with one or more blocks (or operations) associated with FIGS. 1-2.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:

receiving, by at least one processor, image data comprising first image data of a first exposure duration, second image data of a second exposure duration, and third image data of a third exposure duration, wherein the first image data comprises first pixel values, the second image data comprises second pixel values, and the third image data comprises third pixel values, wherein the second exposure duration is greater than the third exposure duration;

generating, by the at least one processor, fourth image data by subtracting the third pixel values of the third image data from the second pixel values of the second image data, wherein the fourth image data is temporally centered within an exposure of the first image data and corresponds to an exposure duration less than the first exposure duration; and generating, by the at least one processor, a first output image frame by combining the fourth image data with the first image data.

2. The method of claim 1, wherein the steps of generating the fourth image data and generating the first output image frame do not include spatial image alignment processing.

3. The method of claim 1, wherein the combining comprises executing a high dynamic range (HDR) fusion algorithm.

4. The method of claim 3, wherein the HDR fusion algorithm comprises:

for each pixel of the first output image frame:

selecting a corresponding pixel of the fourth image data when the pixel is in a highlight region; and selecting a corresponding pixel of the first image data when the pixel is in a shadow region.

5. The method of claim 1, further comprising:

configuring, by the at least one processor, an image sensor to capture the first image data at the first exposure duration, the second image data at the second exposure duration, and the third image data at the third exposure duration.

6. The method of claim 1, further comprising demosaicing the first image data, the second image data, and the third image data before determining the fourth image data.

7. The method of claim 1, wherein the first image data, the second image data, and the third image data are acquired in a single read-out of an image sensor.

8. The method of claim 1, wherein the first image data, the second image data, and the third image data are acquired during a quad high dynamic range (qHDR) readout.

9. The method of claim 1, wherein the first exposure duration is greater than the second exposure duration.

10. An apparatus, comprising:

a memory storing processor-readable code; and at least one processor coupled to the memory, the at least one processor configured to execute the processor-readable code to cause the at least one processor to perform operations including:

receiving, by at least one processor, image data comprising first image data of a first exposure duration, second image data of a second exposure duration, and third image data of a third exposure duration, wherein the first image data comprises first pixel values, the second image data comprises second pixel values, and the third image data comprises third pixel values, wherein the second exposure duration is greater than the third exposure duration;

generating, by the at least one processor, fourth image data by subtracting the third pixel values of the third image data from the second pixels values of the second image data, wherein the fourth image data is temporally centered within an exposure of the first image data and corresponds to an exposure duration less than the first exposure duration; and generating, by the at least one processor, a first output image frame by combining the fourth image data with the first image data.

11. The apparatus of claim 10, wherein the steps of generating the fourth image data and generating the first output image frame do not include spatial image alignment processing.

12. The apparatus of claim 10, wherein the combining comprises executing a high dynamic range (HDR) fusion algorithm.

13. The apparatus of claim 12, wherein the HDR fusion algorithm comprises:

for each pixel of the first output image frame:

selecting a corresponding pixel of the fourth image data when the pixel is in a highlight region; and selecting a corresponding pixel of the first image data when the pixel is in a shadow region.

14. The apparatus of claim 10, wherein the at least one processor is further configured to perform operations including:

configuring, by the at least one processor, an image sensor to capture the first image data at the first exposure duration, the second image data at the second exposure duration, and the third image data at the third exposure duration.

15. The apparatus of claim 10, wherein the at least one processor is further configured to perform operations including demosaicing the first image data, the second image data, and the third image data before determining the fourth image data.

16. The apparatus of claim 10, wherein the first image data, the second image data, and the third image data are acquired in a single read-out of an image sensor.

17. The apparatus of claim 10, wherein the first image data, the second image data, and the third image data are acquired during a quad high dynamic range (qHDR) read-out.

18. A non-transitory computer-readable medium storing instructions that, when executed by at least one processor, cause the at least one processor to perform operations comprising:

receiving image data comprising first image data of a first exposure duration, second image data of a second exposure duration, and third image data of a third exposure duration, wherein the first image data comprises first pixel values, the second image data comprises second pixel values, and the third image data comprises third pixel values, wherein the second exposure duration is greater than the third exposure duration;

generating fourth image data by subtracting the third pixel values of the third image data from the second pixel values of the second image data, wherein the fourth image data is temporally centered within an exposure of the first image data and corresponds to an exposure duration less than the first exposure duration; and generating a first output image frame by combining the fourth image data with the first image data.

19. The non-transitory, computer-readable medium of claim 18, wherein the steps of generating the fourth image data and generating the first output image frame do not include spatial image alignment processing.

20. The non-transitory, computer-readable medium of claim 18, wherein the combining comprises executing a high dynamic range (HDR) fusion algorithm.

21. An image capture device, comprising:

an image sensor;

a memory storing processor-readable code; and at least one processor coupled to the memory and to the image sensor, the at least one processor configured to execute the processor-readable code to cause the at least one processor to:

receive image data comprising first image data of a first exposure duration, second image data of a second exposure duration, and third image data of a third exposure duration, wherein the first image data comprises first pixel values, the second image data comprises second pixel values, and the third image data comprises third pixel values, wherein the second exposure duration is greater than the third exposure duration;

determining generate fourth image data by subtracting the third pixel values of the third image data from the second pixel values of the second image data, wherein the fourth image data is temporally centered within an exposure of the first image data and corresponds to an exposure duration less than the first exposure duration; and determining generate a first output image frame by combining the fourth image data with the first image data.

22. The image capture device of claim 21, wherein the steps to generate the fourth image data and to determine the first output image frame do not include spatial image alignment processing.

23. The image capture device of claim 21, wherein to combine comprises to execute a high dynamic range (HDR) fusion algorithm.

* * * * *